United States Patent [19]

Iwasaki et al.

[11] Patent Number: 4,636,356
[45] Date of Patent: Jan. 13, 1987

[54] ALUMINUM BRAZING ALLOY

[75] Inventors: Shosuke Iwasaki, Hyogo; Tetsuo Abiko, Shinmachi; Michiki Hagiwara; Keizo Nanba, both of Aichi, all of Japan

[73] Assignee: Sumitomo Precision Products Co., Ltd., Amagasaki, Japan

[21] Appl. No.: 717,677

[22] Filed: Mar. 29, 1985

[30] Foreign Application Priority Data

Mar. 30, 1984 [JP] Japan ................................. 59-64385

[51] Int. Cl.[4] ........................................... C22C 21/02
[52] U.S. Cl. ................. 420/532; 228/263.17; 420/548

[58] Field of Search ............... 420/532, 534, 535, 548; 148/415–417, 437–440; 228/263 F

[56] References Cited

U.S. PATENT DOCUMENTS 3,994,695 11/1976 Setzer et al. ....................... 420/548

Primary Examiner—R. Dean
Attorney, Agent, or Firm—Oblon, Fisher, Spivak, McClelland & Maier

[57] ABSTRACT

A brazing material is disclosed, particularly suitable for the brazing of fins onto a heat exchanger exposed to high internal pressure, comprised of an Al-Si based alloy wherein the Fe content is limited to not more than 0.15 wt %. The brazing material is suitable for use in the brazing of Mg-containing materials.

3 Claims, 2 Drawing Figures

ALUMINUM BRAZING ALLOY

BACKGROUND OF THE INVENTION

1. Field of the Invention

The present invention relates to a novel aluminum brazing alloy which helps increase the strength of a solidified structure in brazed joint portions formed by brazing, and which also helps increase the strength against high pressure.

2. Background of the Prior Art

In recent years, plate fin type heat exchangers brazed with an aluminum alloy to exhibit resistance against high pressure have been widely used, for example, in the treatment of natural gases and the development of heat exchangers having superior high pressure resistance, particularly at the fin joints, has continued.

To date, brazing material used for aluminum alloy brazed plate fin type heat exchangers has generally been composed of an Al-Si type alloy when it is to be brazed with flux, or is composed of an Al-Si-Mg type alloy when it is to be brazed without flux. However, the joint formed by using such brazing materials provides a solidified structure which includes a eutectic structure, and is brittle. In particular, when a brazing material of the Al-Si-Mg type is used or when the base metal contains magnesium, the brazed joint exhibits a marked loss of strength.

Study has so far been concentrated on reinforcement of the brazed joints. In the case of a plate-fin type heat exchanger, however, limitation on such improvements are imposed depending upon the shapes of fins, amount brazing materials supplied and properties of the brazing material. With the high-pressure plate-fin type heat exchanger which requires a high joint strength, therefore, it continues to be essential to increase the strength of the joint structure in the brazed portions of fins.

SUMMARY OF THE INVENTION

An object of the present invention is to provide a novel aluminum brazing alloy which helps increase the strength of the solidified structure in the brazed joint portions formed by flux brazing or fluxless brazing.

The inventors have applied internal pressure to plate-fin-type heat exchangers to destroy the brazed portions of fins by application of tensile force or shearing force, in order to observe the destroyed portions, and have found that the destruction takes place not in the $\alpha$-phase where the tensile force is the smallest but in the whole eutectic structure portion. Analysis of the broken surface revealed the formation of Al-Si-Fe type compounds in large amounts when the Al-Si type brazing material was used, and the formation of Al-Si-Mg-Fe type compounds in large amounts when the Al-Si-Mg type brazing material was used or when the base metal contained magnesium.

Consequently, it was concluded that hard and brittle iron-containing compounds that were scattered in the eutectic structure in the joint portions decreased the strength of the joint structure.

The present invention is based on the above discovery, and deals with an aluminum brazing alloy for flux brazing and fluxless brazing, characterized in that the content of iron is reduced to 0.15% by weight or less.

DETAILED DESCRIPTION OF THE PREFERRED EMBODIMENTS

Figure 1:
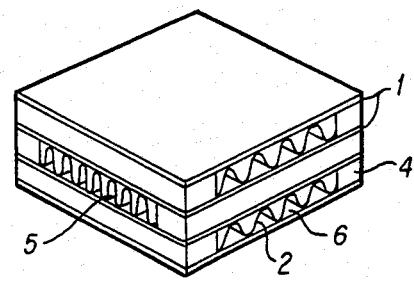
FIG. 1 is a perspective view of a plate-fin type heat exchanger subjected to the burst test.
Figure 2:
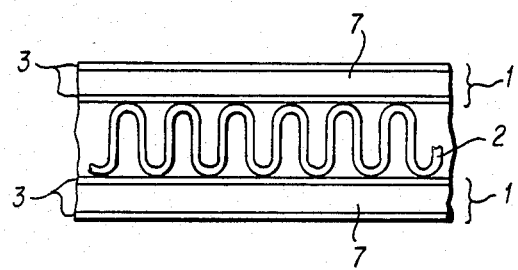
FIG. 2 is a front view showing on an enlarged scale a portion of the heat exchanger.

Test materials were prepared by varying the iron content in the base metal and in the brazing material as shown in Table 1, and heat exchangers of the plate-fin structure shown in FIG. 1 were constructed by the combination of base metals and the test members shown in Table 2 by means of flux brazing and fluxless brazing as shown, in order to carry out testing by applying an internal pressure thereto. Said brazing is affected using standard prior art techniques and conventional process parameters in general, which do not constitute an aspect of this invention, per se. In FIGS. 1 and 2, reference numeral 1 denotes brazing sheets, 2 denotes fins, 3 denotes a brazing material, 4 denotes spacer bars, 5 denotes test paths, and 6 denotes dummy paths.

TABLE 1

| Test material | Chemical components | Chemical Components of test materials | | | | | | | | |
|---|---|---|---|---|---|---|---|---|---|---|
| | | Si | Fe | Cu | Mn | Mg | Cr | Zn | Ti | Al |
| Corres. to 3003 | Alloy a | 0.21 | 0.60 | 0.12 | 1.10 | 0.02 | 0.02 | 0.04 | 0.01 | balance |
| | Alloy b | 0.26 | 0.11 | 0.16 | 0.13 | 0.03 | 0.02 | 0.03 | 0.01 | " |
| Corres. to 3004 | Alloy c | 0.27 | 0.63 | 0.18 | 1.23 | 1.07 | 0.01 | 0.04 | 0.01 | " |
| | Alloy d | 0.25 | 0.15 | 0.19 | 1.21 | 1.22 | 0.02 | 0.05 | 0.01 | " |
| Corres. to 4047 | Alloy A | 11.7 | 0.65 | 0.01 | 0.01 | 0.01 | 0.02 | 0.01 | 0.01 | " |
| | Alloy B | 11.3 | 0.15 | 0.02 | 0.01 | 0.01 | 0.02 | 0.01 | 0.01 | " |
| | Alloy C | 11.3 | 0.04 | 0.01 | 0.01 | 0.01 | 0.03 | 0.01 | 0.01 | " |
| Corres. to 4004 | Alloy D | 10.1 | 0.70 | 0.01 | 0.01 | 1.45 | 0.03 | 0.01 | 0.01 | " |
| | Alloy E | 9.8 | 0.14 | 0.03 | 0.01 | 1.56 | 0.02 | 0.01 | 0.01 | " |
| | Alloy F | 10.2 | 0.02 | 0.02 | 0.01 | 1.49 | 0.03 | 0.01 | 0.01 | " |

TABLE 2

| Brazing methods | Brazing materials | No. | Base metals (fin metals) | Pressure for burst test samples | Broken portion | Remarks |
|---|---|---|---|---|---|---|
| FLUX BRAZING | A (corres. to 4047) | 1 | a (corres. to 3003) | 303 kg/cm$^2$ (G) | joints | |
| | | 2 | b (corres. to 3003) | 315 | " | |
| | B (corres. | 3 | a (corres. | 401 | fins | (joint strength |

TABLE 2-continued

| Brazing methods | Brazing materials | No. | Base metals (fin metals) | Pressure for burst test samples | Broken portion | Remarks |
|---|---|---|---|---|---|---|
| | to 4047) | | to 3003) | | | not confirmed) |
| | | 4 | b (corres. to 3003) | 408 | " | (joint strength not confirmed) |
| | C (corres. to 4047) | 5 | a (corres. to 3003) | 410 | " | (joint strength not confirmed) |
| | | 6 | b (corres. to 3003) | 417 | " | (joint strength not confirmed) |
| | A (corres. to 4047) | 7 | c (corres. to 3004) | 351 | joints | |
| | | 8 | d (corres. to 3004) | 344 | " | |
| | B (corres. to 4047) | 9 | c (corres. to 3004) | 486 | fins | (joint strength not confirmed) |
| | | 10 | d (corres. to 3004) | 480 | " | (joint strength not confirmed) |
| | C (corres. to 4047) | 11 | c (corres. to 3004) | 492 | " | (joint strength not confirmed) |
| | | 12 | d (corres. to 3004) | 501 | " | (joint strength not confirmed) |
| FLUXLESS BRAZING | D (corres. to 4044) | 13 | a (corres. to 3003) | 289 | joints | |
| | | 14 | b (corres. to 3003) | 277 | " | |
| | E (corres. to 4044) | 15 | a (corres. to 3003) | 395 | fins | (joint strength not confirmed) |
| | | 16 | b (corres. to 3003) | 406 | " | (joint strength not confirmed) |
| | F (corres. to 4044) | 17 | a (corres. to 3003) | 403 | " | (joint strength not confirmed) |
| | | 18 | b (corres. to 3003) | 403 | " | (joint strength not confirmed) |
| | D (corres. to 4044) | 19 | c (corres. to 3004) | 339 | joints | |
| | | 20 | d (corres. to 3004) | 348 | " | |
| | E (corres. to 4044) | 21 | c (corres. to 3004) | 492 | fins | (joint strength not confirmed) |
| | | 22 | d (corres. to 3004) | 490 | " | (joint strength not confirmed) |
| | F (corres. to 4044) | 23 | c (corres. to 3004) | 505 | " | (joint strength not confirmed) |
| | | 24 | d (corres. to 3004) | 494 | " | (joint strength not confirmed) |

The test results are shown in Table 2. When the iron content in the brazing material is reduced to 0.15% by weight or less, the ultimate strength of brazed joints of fins increases by 30% to 49% compared with examples when iron is contained in an amount close to the upper limit of the standarized value. Therefore, the iron content in the brazing material is specified to be 0.15% by weight or less.

According to Test Nos. 2, 8, 14 and 20 of Table 2, joints are broken though the iron contents are small in the base metal, since the iron contents in the brazing materials are outside the range specified by the present invention. According to Test Nos. 3, 5, 9, 11, 15, 17, 21 and 23, on the other hand, the strength at the brazed joints is so improved as to become greater than the ultimate strength of fins though iron is contained in large amounts in the base metal, since the iron content in the brazing materials lies within the range defined by the present invention. In other words, the ultimate strength is affected little by the iron content in the base metals. The strength of bazed joints is improved if the iron content in the brazing material is selected to be 0.15% by weight or less; i.e., joints having strength greater than the ultimate strength of fins can be obtained in this way.

The above-mentioned effects are obtained even when a material of the Al-Si type corresponding to JIS 4047 is used, or even when a material of the Al-Si-Mg type corresponding to JIS 4004 is used, and even when magnesium is contained in the base metal (fin metal) that is to be joined.

Iron present on the broken surface of tested joints was analyzed using a sample that offered joints having a strength greater than the ultimate strength of fins. It was observed that iron was present not in the form of a compound but in the form of a solid solution in the α-phase. It can be easily presumed that the above change helps increase the toughness of joints and increase the strength of the joints as a whole.

The present invention makes it possible to increase the strength of a joint structure to meet the purposes in manufacturing large equipment in which brazing is effected under sever conditions and limitation is imposed on the size of the brazed joints.

Though it has generally been believed that the materials containing magnesium could not be sufficiently jointed with brazing, the use of the alloy of the present invention serves to increase the strength of the structure to thereby meet this objective.

Using the Al-Si-Mg type brazing material, furthermore, the joints become brittle since magnesium is left in the brazed joints. By suppressing the iron content in the brazing material to 0.15% by weight or less in accordance with the present invention, however, the strength of the structure can be increased to overcome this obstacle.

What is claimed as new and desired to be secured by letters patent of the United States is:

1. An aluminum brazing alloy, consisting essentially of Si from 9.8–11.7%, Fe 0.02 to 0.15%, Cu from 0.01–0.03%, Mn at about 0.01%, Mg from 0.01–1.56%, Cr from 0.02–0.03%, Zn at about 0.01%, Ti at about 0.01%, and the balance aluminum, all on a weight basis as a percentage of the total.

2. A method of brazing metal material to form a joint therebetween using an aluminum brazing alloy, the improvement comprising forming said joint with said aluminum brazing alloy consisting essentially of Si from 9.8–11.7%, Fe from 0.02–0.15%, Cu from 0.01–0.03%, Mn at about 0.01%, Mg from 0.01–1.56%, Cr from 0.02–0.03%, Zn at about 0.01%, Ti at about 0.01%, and the balance aluminum, all on a weight basis as a percentage of the total.

3. A method of joining two pieces of material, at least one of said pieces containing magnesium, comprising brazing said pieces with an aluminum brazing alloy consisting essentially of Si from 9.8–11.7%, Fe from 0.02–0.15%, Cu from 0.01–0.03%, Mn at about 0.01%, Mg from 0.01–1.56%, Dr from 0.02–0.03%, Zn at about 0.01%, Ti at about 0.01%, and the balance aluminum, all on a weight basis as a percentage of the total.

* * * * *